Patented Jan. 9, 1951

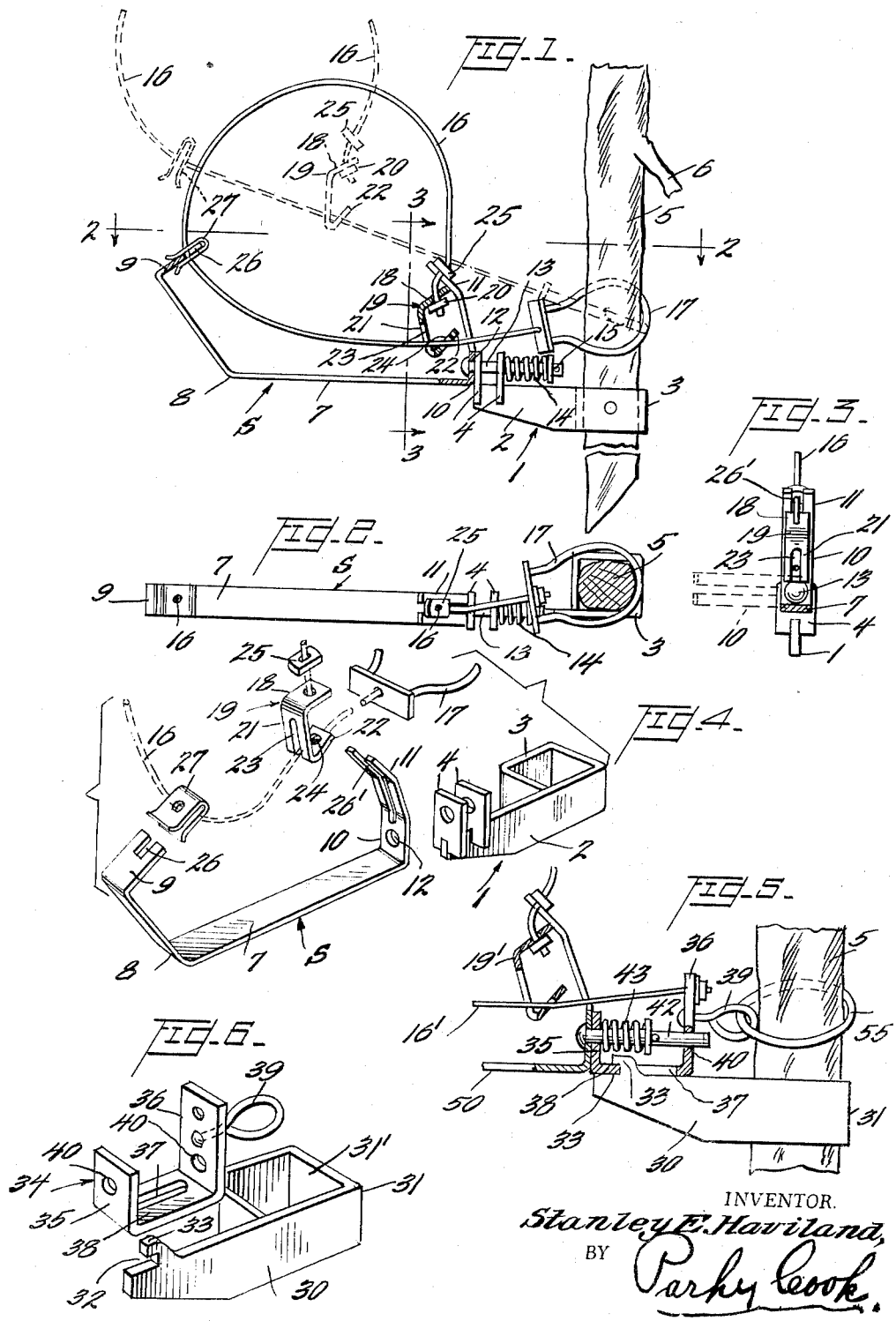

2,537,894

UNITED STATES PATENT OFFICE 2,537,894

SNARE TRAP

Stanley E. Haviland, Absecon, N. J.

Application April 21, 1949, Serial No. 88,853

5 Claims. (Cl. 43—87)

My invention relates to new and useful improvements in animal traps, and more particularly to the type of snare traps that are used to trap small predatory and fur-bearing animals.

One of the objects of the invention is to provide a snare trap wherein there is a support for the noose so that after the snare is once set, a considerable amount of lateral pressure is necessary to force the noose from its vertical position. Thus the snare may be set in a meadows that may become flooded, but driftwood or floating materials will not ordinarily upset the noose.

Still another object of the invention is to provide a snare trap with a support for the noose, which support in turn is pivoted or has a swivel action so that when the animal places its head through the noose and exerts a forward pressure that is in line with the axis of the noose, the support that holds the noose as well as the noose will swing forwardly so that the pull on the noose will be in direct alignment with slots in the support that holds the noose, thus causing the noose or snood to always easily pull from its support.

Still another object of the invention is to provide a snare trap with a novel form of support so that after the animal is ensnared, the support will probably lie flat and thus be out of the way of the struggling animal.

Still another object of the invention is to provide a snare trap wherein the noose or snood, as it is sometimes called, is provided with a lock that always permits the noose to lessen in diameter but never enlarge, so that once the animal is ensnared there is no possible way of escape.

Still another object of the invention is to provide a snare with a bracket support and outstanding arm from the bracket which latter will always hold the noose in its upright position unless relatively great force is used to upset it, and wherein the lock on the noose is set in an arm so that it may quickly be pulled from its position but it can never accidentally be removed.

Still another object of the invention is to provide a snare trap wherein the noose or snood may quickly and easily be set and will remain in position until acted upon by an animal.

Still another object of the invention is to provide a snare trap that is inexpensive to manufacture, readily assembled, and positive in action.

With these and other objects in view, the invention consists in certain new and novel arrangements and combination of parts as will be hereinafter more fully described and pointed out in the claims.

Referring now to the drawings, showing a preferred embodiment and one modification, Fig. 1 is a side view of the trap set for action, and the dotted lines showing the noose as having been sprung, Fig. 2 is a horizontal sectional view taken on line 2—2 of Fig. 1, Fig. 3 is a partial sectional view taken on line 3—3 of Fig. 1, Fig. 4 is an exploded view, showing the parts about to be assembled, Fig. 5 is a fragmentary detailed view, part in section, showing a slight modification of the support for the noose, and Fig. 6 is a perspective view of the modified support of Fig. 5.

Referring now to the several views, and, for the moment to Fig. 1, there is shown what I term the main bracket 1, having a forward portion 2, the rear end of main bracket 1 is bent to form a rectangular enclosure as shown at 3 (Fig. 2). On the outer end of this forward portion 2 may be seen two spaced upstanding ears 4. Thus the bracket 1 has a rectangular rear end 3 through which a stake 5 may be passed and has the forward extending portion 2 with the upstanding lugs or ears 4, each having an aperture therethrough.

It will be understood that the rear portion 3 might be shaped other than in a rectangular manner as the purpose is to form an eye or opening through which the fastening stake 5 will pass.

It will be noticed that a post or stake 5 will be selected that may have a small branch 6 near its top, so that a yoke (to be hereinafter mentioned) that holds the noose will not slip up off the stake 5; nor will it allow the bracket 1 to slip up the post 5. Of course, a stake with an increasing diameter might also be used.

Still referring to Fig. 1, there will be seen a relatively long noose support S having the horizontally extending body 7, which is then bent upwardly as at 8 and then inwardly to form the short arm 9. At the rear end of the body portion 7 the support S is again bent upwardly at a right angle to form a rear arm 10 and then slightly inwardly to form the ear 11.

The rear arm 10 is drilled as at 12 to form an opening and through the opening is passed the bolt 13, this in turn passing through the aforementioned upstanding ears 4. Back of the rear ear 4 and mounted on the bolt 13 is the spring 14 which is held by the washer and pin 15 at the rear end of the bolt 13. This bolt 13 is slightly less in diameter than the openings in the ears 4 so that any lateral pressure exerted on the upper ears 9 and 11 of this noose support S will cause the noose support S to swing from its vertical to an angular position.

It will be understood, however, that the spring 14 holds the noose support S relatively rigid, and any small floating driftwood or grass or other similar pressure exerted on the noose support S will not move it from its vertical position.

Thus, after the trap is once set, there is very little likelihood of its ever being accidentally disrupted and put out of use.

Referring now to the noose or wire snood 16, this is generally formed of a flexible woven cable and may be of steel or non-corrosive metal; and on its one end there is secured the yoke or eyelet 17 which as heretofore mentioned is to be secured about the stick 5 on which the bracket 1 is also supported.

The length of the wire snood or cable 16 is such that when looped it will be supported and will appear as shown in Fig. 1. The outer end of the cable 16 is passed through an upwardly bent arm 18 of a lock 19; and on the cable 16 and just beneath the arm 18 is a small nut 20, so that the cable 16 can not pull loose from the lock 19. The lock 19, as heretofore mentioned, has the angular-shaped arm 18, the downwardly extending body portion 21, and an upwardly extending arm or ear 22.

The body portion 21 has the elongated slot 23 therein, and the arm portion 22 has a circular hole 24 therein, and the cable or noose 16 is passed through these two openings 23 and 24 before the yoke 17 is placed in position.

Thus, when an animal passes his head through the noose 16 it will tighten (as shown in dotted lines in Fig. 1); but, as is well known, the lock 19 will choke the cable 16 on an outward pull of the noose 16 and lock 19 so that the lock 19 can not slip back on the cable 16.

Thus, the greater the pull by the animal with his head through the noose 16 will tend always to tighten the noose 16 but it can not loosen it.

Also secured on the noose 16 and just above the lock 19, I secure a washer or nut 25 in a fixed position. Now the noose support S has an elongated open slot 26 in the arm 9; and it also has an elongated open slot 26' in the outer end of the arm 10. Also, as may be seen in Fig. 1, slideably mounted on the noose or snood 16 is the small clip 27.

Thus, to support the noose 16 in its vertical position, I slip the cable or noose 16 in the open slot 26' in the arm 10 just below the nut 25; and I also place the other side of the snood or noose 16 in the open slot 26 in the arm 9 and place the little clip 27 in position over the arm 9 to thus rigidly support the snood or noose 16 in its upright effective position.

Thus, when an animal places his head through the snood or noose 16, the forward motion of the animal at right angles to the noose support S will tend to turn the noose support S in the position in which the animal is travelling, so that the noose 16 may pull directly out of the open slots 26 and 26' in the arms 9 and 10, thus the arms 9 and 10 offering no resistance to the slipping of the noose 16 out of its open slots 26 and 26'. In other words, the pull on the noose 16 is in direct alignment with the alignment of the open slots 26 and 26' in the said arms 9 and 10.

Furthermore, as the animal struggles, the noose support S will be swung over, and he (the animal) will not have a tendency to tear the fur against this noose support S.

Referring now to the modified form shown in Figs. 5 and 6, there is shown a slightly different form of main bracket 30 which is likewise bent at its rear end as at 31 to form an enclosure 31' through which the stick 5 may be passed; and on the forward end of the bracket 30 there will be seen the cut-out portion 32 and the overhanging ear 33. In this form, rather than having the two upstanding integral ears 4 I utilize a small angular-shaped bracket 34 having the upturned forward end 35 and the rear upturned end 36 and an elongated slot 37 in its bottom 38. In the rear arm 36 is secured an eyelet 39 and there are apertures 40 in the two arms 35 and 36, through which a bolt 42 (Fig. 5) passes, the same spring arrangement 43 being used as shown in the preferred form.

The noose or cable 16' is fastened to the rear arm 36 of this bracket 34 and the noose 16' passes through the lock 19' in the same manner as in the preferred form. Also, the noose support 50 is identical with that shown in the preferred form.

As may be seen in Fig. 5, the lug or ear 33 will ordinarily pass up through the slot 37 in this angular bracket 34 and thus hold the noose 16' in its supported position. However, as soon as the animal places his neck through the noose 16', the small angular bracket 34 will slip forward on its bracket 30 to disengage the ear 33 from the slot 37, and the tightening action and the strangling action will be the same as in the preferred form.

To re-set the trap, of course, the noose 16' will be fastened in its noose support 50; and this small angular bracket 34 will again be set under the ear 33. In the eyelet 39 there may be secured a larger ring 55 which in turn will be slipped or held over the post 5.

It will be noticed in this instance that the noose or snood wire 16' is fastened directly to the small angular bracket 34 rather than having a yoke on its inner end to pass over the post 5.

From the foregoing it will be seen that I have produced a snare trap which may be made in different sizes, depending on the animals to be trapped, and wherein the snood or noose will be supported in its upright position and securely held against accidental displacement.

Furthermore, when the animal is ensnared, the forward or rearward motion of the animal will tend to pull the noose so that it is always in alignment with the slots and thus making sure that the lock and the noose will pull free from the noose support.

Finally, also, by having the noose support arranged to swivel or swing, it will lie flat and not tear the fur of the animal.

Many slight changes might be made without departing from the spirit and scope of the invention.

Having thus described my invention, what I claim is new and desire to secure by Letters Patent is:

1. In a snare trap, a bracket adapted to have a stake pass therethrough to secure the bracket to the ground, a noose support having two inwardly and upwardly extending ends, said noose support being pivotally secured to said bracket, spring means for normally holding the noose support in an upright position, a wire cable having a noose formed therein and a slip lock at one end, the other end of the cable passing through said lock, the lock permitting the noose to tighten but not loosen under pressure, the noose support having open slots in said ends the said noose normally fitting in said slots to hold the noose in an upright position, said noose slipping out of said open ended slots when an animal passes his head therethrough, and means for securing said other end of the cable to the stake.

2. In a snare trap, a bracket having confining walls to receive a stake, a noose support pivotally carried thereby, tension means for normally holding the support against accidental pivotal movement, said support having two spaced arms, whose ends point upwardly and inwardly towards each other, said arms having open ended slots formed therein at their ends for supporting a noose in a vertical position, a wire cable having a lock secured to one end and the other end of the cable passing through said lock to form a noose in the cable, the said lock being slideable in one direction on the cable to tighten the noose but not slideable under pressure in the other direction, the said noose being normally engaged in said noose support but adapted to slip freely from said open ended slots in the arms of said support when an animal forces his head through said noose, and means for holding the other end of the cable.

3. In a snare trap, a bracket having walls adapted to be secured about a stake, a noose support including two upwardly extending arms said support being pivotally secured to said bracket in such a manner as to extend outwardly therefrom, spring means for normally holding the noose support in an upright position, a wire cable having a lock at one end, the other end of the cable passing through said lock to form a noose, the lock being slideable in one direction to reduce the diameter of the noose but not slideable in the opposite direction under pressure, the noose support being provided with open ended slots at opposite points, the said noose normally fitting in said slots to hold the noose also in an upright position, said noose being adapted to slip from said open ended slots and tightening when an animal applies force in passing his head therethrough, the said noose support also being adapted to pivot in the direction in which the force is exerted by the animal passing his head therethrough, and means for securing the other end of the cable to the stake.

4. In a snare trap, a bracket having walls adapted to be secured about a stake, a noose support having an outwardly extending horizontal body and two spaced inwardly extending arms at the end of said body, said arms being provided with slots in their ends to releasably support a noose, a cable bent to form a noose, a slip lock on the cable, a clip slideable on said cable, the noose being normally supported in the slots in said arms, the clip adapted to pass over one of said arms to assist in holding the noose in place, and means for securing the other end of the cable to the stake, the slip lock on said noose tightening but not loosening under pressure by an animal.

5. In a snare trap, a bracket adapted to have a stake pass therethrough to secure the bracket to the ground, a second bracket releasably mounted on said first-mentioned bracket, a noose support having two upwardly extending supporting means, said support being pivotally secured to said second-mentioned bracket, spring means for normally holding the noose support in an upright position with respect to the second-mentioned bracket, a wire cable forming a noose and provided with a lock at one end, the other end of the cable passing through said lock, the lock permitting the noose to tighten but not loosen under pressure, the noose support having open ended slots in its upwardly extending supporting means the said noose normally fitting in said slots to hold the noose in an upright position, said noose being adapted to slip out of said slots when an animal passes his head therethrough, the second-mentioned bracket being adapted to slip off the said first-mentioned bracket, and means for securing the free end of the cable to the stake.

STANLEY E. HAVILAND.

REFERENCES CITED

The following references are of record in the file of this patent:

UNITED STATES PATENTS

| Number | Name | Date |
|---|---|---|
| 1,738,907 | Kleffman | Dec. 10, 1929 |

FOREIGN PATENTS

| Number | Country | Date |
|---|---|---|
| 376,262 | Great Britain | June 30, 1932 |